J. C. ANDERSON.
TIRE.
APPLICATION FILED MAR. 22, 1916.
1,254,016.
Patented Jan. 22, 1918.
2 SHEETS—SHEET 1.
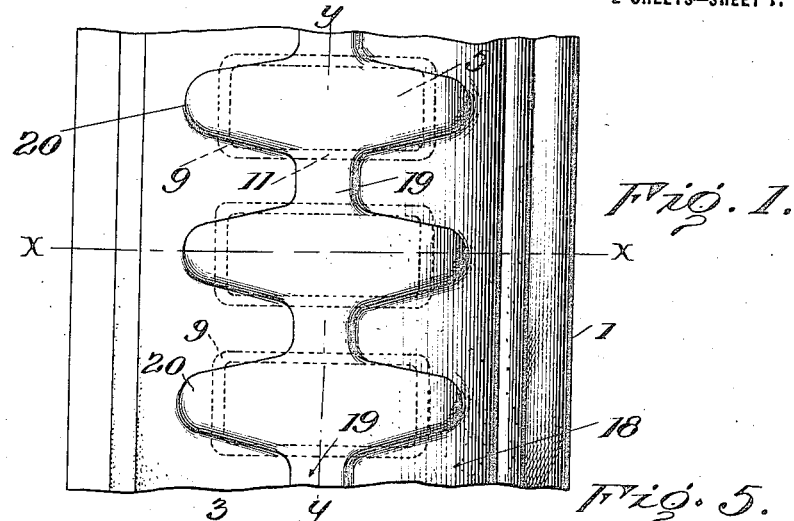
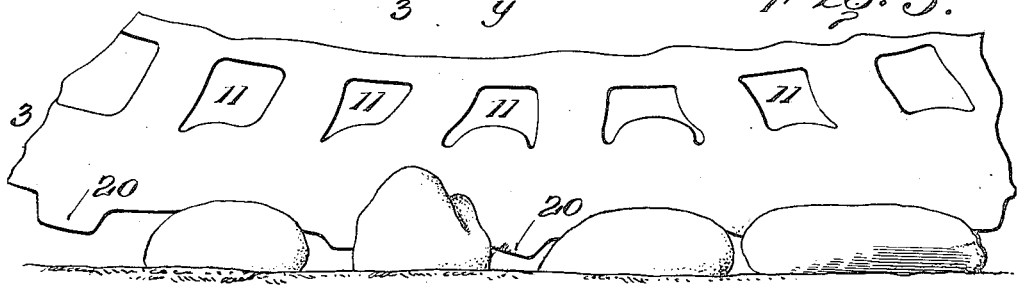
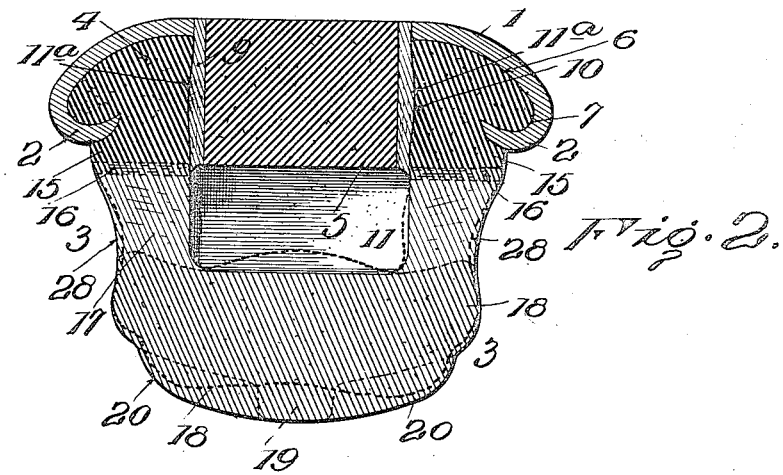
Inventor
J. C. Anderson.
By
Attorney

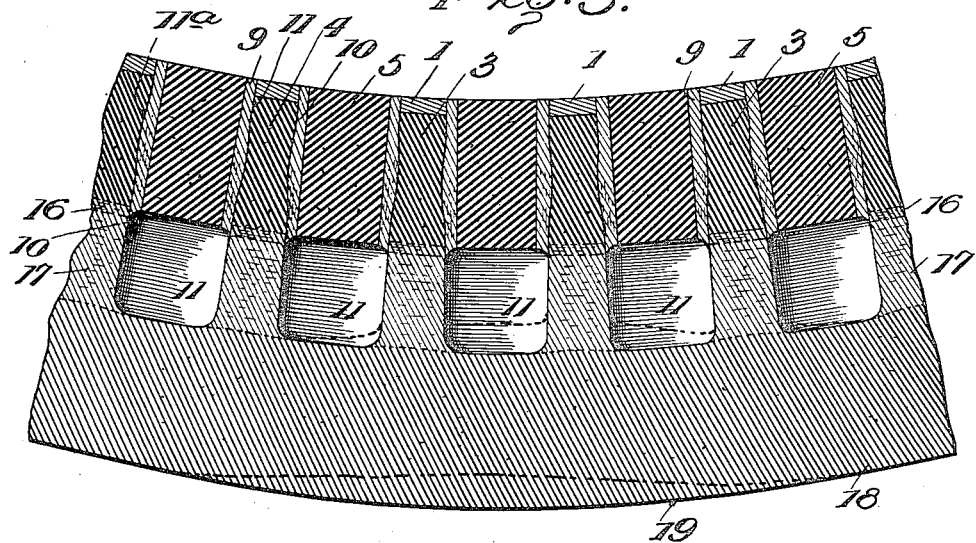
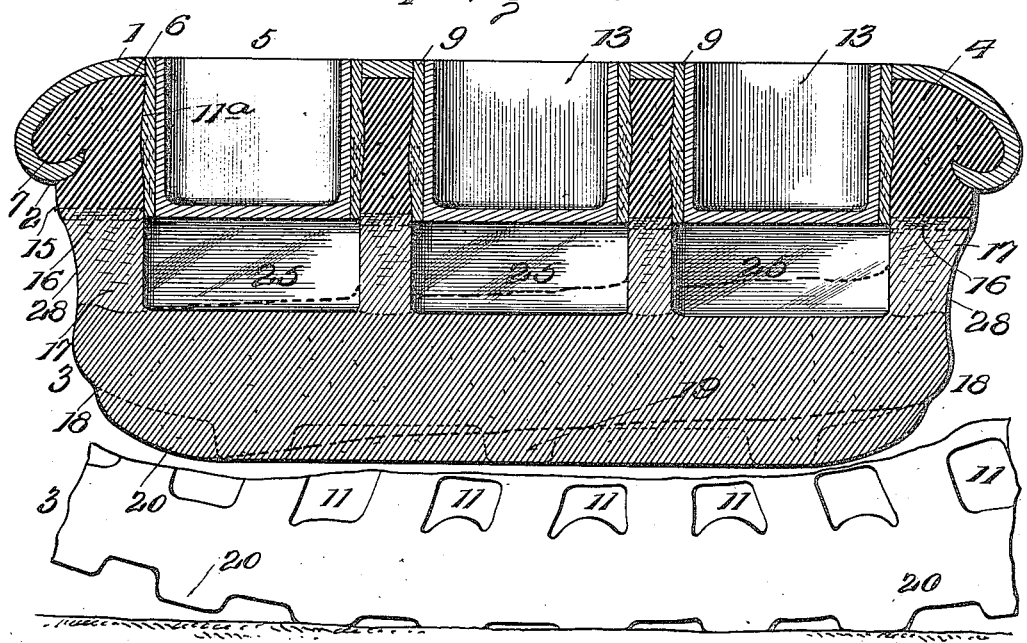

UNITED STATES PATENT OFFICE.

JAMES C. ANDERSON, OF WASHINGTON, DISTRICT OF COLUMBIA.

TIRE.

1,254,016.   Specification of Letters Patent.   Patented Jan. 22, 1918.

Application filed March 22, 1916. Serial No. 85,846.

*To all whom it may concern:*

Be it known that I, JAMES C. ANDERSON, a citizen of the United States, residing at Washington, in the District of Columbia, have invented certain new and useful Improvements in Tires, of which the following is a specification.

This invention relates to improvements in tires of the type disclosed in my application for patent filed Jan. 23, 1915, Serial No. 3983.

In carrying the invention into use, I employ the same general principle of construction employed in the tire described and claimed in the before mentioned application, *i. e.* so forming the tire as to distort the walls of a cellular structure to compress air confined in the cells, to form a pneumatic resistance to load strain.

In the present invention, the cells are closed and individual, and each contains air compressed to a limited degree, but capable of being further compressed when load strain is applied.

One of the prime objects of the invention is to provide a built up cellular tire structure, having varying strata of rubber, or composition thereof, to obtain the effective result required in the action of the tire body when load strain is applied. The configuration of the tire structure is such as to cause the sides thereof to be distorted inwardly toward each other when load pressure is applied to progressively reduce the area of the cells and compress the air therein, and to this end the varying strata of rubber are designed to increase the distortion of the walls of the cells on the contained bodies of air.

A further object of the invention is to provide a cellular tire body with a specially constructed tread to coöperate with the cells when compressing the air, whereby to obtain the highest degree of efficiency when an obstruction is encountered, and to further act as a means to insure against the tread slipping on the road surface.

The invention also comprehends improvements in the details of construction and arrangement of parts which will be hereinafter described and particularly pointed out in the claims.

In the drawings:

Figure 1 is a plan view of a portion of a tire constructed in accordance with my invention.

Fig. 2 is a section of the same on the line *x—x* of Fig. 1.

Fig. 3 is a section on the line *y—y* of Fig. 1.

Fig. 4 is a section similar to Fig. 2, but showing a tire especially designed for heavy trucks, and further showing a slightly different form of filling block for the air cells.

Fig. 5 is a diagrammatic illustration showing the action of the tire when passing over stones or a rough surface.

Fig. 6 is a similar view illustrating the condition of the tire under normal load strain.

The numeral 1 indicates a metal rim, the opposite sides of which are bent upwardly and inwardly toward each other to provide flanges 2 for receiving the tire body.

3 indicates a tire body as a whole, the base 4 thereof, having spaced inserts 5.

The base is constructed of hard, vulcanized rubber composition, the outer edges 6, and the inner surface 7, being vulcanized in the rim, the outer edges fitting snugly the side flanges 2, and forming an interlock and substantially an integral structure. The inserts 5 may be hard rubber blocks, surrounded by a thin, soft rubber coating 9, which adheres to the walls 10 of the cells 11, in the base, as shown in Fig. 2, or the inserts may be in the form of hollow metal plugs 13, surrounded by soft rubber, as shown in Fig. 4. These inserts are for the purpose of trapping air in the cells 11, formed in the tire structure, as will be hereinafter described. The soft rubber coating 9 forms a seal to prevent the air escaping, once the tire parts are assembled.

The soft rubber 9 is subjected to treatment to cause it to adhere to the adjacent surfaces, and is additionally held in place by reason of the walls of the openings in the base shrinking, and forming grooves, such as indicated at 11ª, the rubber accommodating itself in the grooves.

The hard rubber base extends a short distance beyond the rim, as shown at 15, and on the outer surface of the base is a layer of rubber 16, which is somewhat softer than the material of the base, but is vulcanized thereto. On the layer of rubber 16, is an intermediate layer of rubber 17, which is vulcanized to the layer or stratum 16, and is softer than the rubber 16. In the intermediate layer or stratum of rubber 17, are formed the closed cells 11, corresponding to the number of inserts 5, the latter forming one wall of the cells, as shown in the drawing. Over the layer 17, and vulcanized thereto, is an outer layer of rubber 18, forming the tread of the tire. The tread layer is somewhat harder than the layer 17, to add to the wearing qualities, and the meeting surfaces of the layers where vulcanized together may be irregular in form to assist in anchoring the two layers together.

The tread surface is specially constructed to coöperate with the cellular structure, and forms an important part of the present invention. Centrally and circumferentially of the tread is a rib 19, and extending from opposite sides thereof are spaced transverse ribs 20. Each rib 20 is disposed over a cell 11, which increases the thickness of the material at the cellular points, and compensates for the amount of rubber displaced by the cells. The tire body between the ribs 20, and the rim forms substantially a solid mass of material, while the ribs lend resiliency and leverage to the body of rubber over the cells, with the result that when an obstruction is encountered, the outer wall readily yields inwardly and distorts the walls of the cell and compresses the air contained therein, and at the same time the tread tends to "cup" inwardly, as shown in dotted lines in Figs. 2, 3 and 6. This action creates a suction on the tread surface and causes a gripping action on the road.

Under normal load strain the tire is distorted so that the outer surface of the ribs becomes flush with the adjacent tread surface, with the result that the walls of the cells become distorted in all directions and the air is compressed, this action of the parts being shown in Fig. 6 of the drawings.

The sides of the tire body are slightly concaved, as shown at 28, to cause inward and upward distortion of the walls of the cells when load strain is applied, in exactly the same manner as disclosed in the before mentioned application.

When the inserts are placed in the cells, the air is trapped and compressed, and because of the sealing of the cells, the air is maintained in this compressed state, and is further compressed when the tire is in use.

A tire constructed as described has been found to produce all the practical results obtained in the use of a pneumatic tire, without the usual inconveniences and difficulties incident to punctures, flat tires, etc.

When load strain is applied, or an obstruction is encountered, the forces are exerted inwardly toward the center of the cells, and the walls thereof are distorted and the contained air is compressed, and the air in the succeeding cells is progressively compressed, as shown in Fig. 5. This action is due to the fact that the outer sides of the tire are slightly concaved, as explained in my before mentioned application. This construction effectually distorts the side walls of the cells inwardly, and also the outer walls inwardly with the consequent result of compressing the air. To insure of the walls compressing, the base of the tire body must be stable to resist the inward movement of the material to cause same to distort with the proper degree, whereby to insure of compressing the air. To augment this action, the intermediate stratum of rubber 17, is, comparatively speaking, more "lively" or resilient than the tread stratum. Obviously then, when pressure is applied to the tread stratum, the intermediate stratum distorts more readily than the former.

In carrying out the invention for use in connection with trucks, there is a progressive transverse, as well as a progressive circumferential compression of the cell walls, which is of vital importance in preventing undue shocks and distortion of the running gear of the vehicle.

In Fig. 4, the width of the tire is increased and a number of the cells 25 are arranged in transverse alinement. These cells are individually closed, and contain air under slight pressure, as previously described. Save for the increased number in transverse alinement, the structure is substantially the same.

As shown in dotted lines in Fig. 4, if the tire meets an obstruction to one side of the circumferential center, the adjacent transverse cells progressively compress the air in the cells. Hence the strain on the wheel is equalized in all directions.

What I claim is:—

1. A tire comprising a body formed of a hard base and a body portion composed of superposed layers of rubber of different degrees of resiliency and provided with a plurality of closed cells containing air, one wall of each of said cells being formed by the hard base, the sides of the tire being concaved to cause said sides to be distorted inwardly toward each other when load pressure is applied to progressively reduce the cubic contents of the cells and compress the air therein when the tire is subjected to load strain.

2. A tire formed with a plurality of spaced closed cells, each of which contains air, the tire body including a hard base forming one wall of each cell and a stratum of resilient material forming the remaining walls of the cells, said tire body being constructed to cause the sides thereof to be distorted inwardly toward each other when load pressure is applied to progressively reduce the cubic contents of the cells and compress the air therein when the tire is subjected to load strain.

3. A tire comprising a body formed of rubber having a plurality of radially disposed cells, each cell having a radially disposed insert at its inner end to seal the cell and compress the air contained therein, the inserts forming one wall of the cells, the sides of the tire body being inwardly concaved to cause the side walls of the cells to be distorted inwardly toward each other when load pressure is applied to progressively reduce the cubic contents of the cells and further compress the air therein.

4. A tire comprising a body formed of a hard base and strata of rubber of different degrees of resiliency and provided with a plurality of cells, an insert in each cell forming one wall of said cell and providing means for trapping air in the cell, the tire body being constructed to cause the sides thereof to be distorted inwardly toward each other when load pressure is applied to progressively reduce the cubic contents of the cells and compress the air therein when the tire is subjected to load strain.

5. A tire comprising a body formed of strata of rubber of different resiliency and a hard base, the more resilient strata of rubber being provided with a plurality of radial cells, the strata of rubber between the more resilient strata of rubber and the base serving as a vulcanized binder with the base, and the outermost strata of rubber being of less resiliency than the strata formed with the cells, and is of greater resiliency than the base, and means coöperating with each individual cell for trapping air and compressing same and sealing the cell, the tire body being constructed to cause the sides thereof to be distorted inwardly toward each other when load pressure is applied to progressively reduce the cubic contents of the cells and compress the air therein when the tire is subjected to load strain.

6. A tire comprising a body formed of a hard base and resilient material vulcanized to said hard base, said tire having a plurality of individual radially disposed cells and radially disposed inserts extending through the base and into the cells, to trap air and compress same and seal said cell, the tire body being constructed to cause the sides thereof to be distorted inwardly toward each other when load pressure is applied to progressively reduce the cubic contents of the cells and compress the air therein when the tire is subjected to load strain.

7. A tire body formed of a hard base and strata of material of different degrees of resiliency and provided with a plurality of sets of radial circumferentially arranged closed cells, the hard base forming one wall of the closed cells, the cells in the sets being in transverse alinement, the tread surface of the outermost strata of vulcanizable material extending across the transverse plane of the outer walls of the cells to cause the same to be distorted radially under load strain, said body being constructed to cause the sides thereof to be distorted inwardly toward each other when load pressure is applied to progressively reduce the cubic contents of the cells and compress the air therein when the tire is subjected to load strain.

8. A tire comprising a base of hard material and a rubber body vulcanized thereto, said tire having individual spaced cells containing compressed air, radial inserts fitted in the cells to seal the latter and confine the air therein, and thin layers of rubber between the inserts and the base, the thin layers of rubber and said base being vulcanized to anchor the inserts, the tire body being constructed to cause the sides thereof to be distorted inwardly toward each other when load pressure is applied to progressively reduce the cubic contents of the cells and compress the air therein when the tire is subjected to load strain.

9. A tire comprising a rim provided with side flanges and a plurality of radial circumferentially arranged openings, a base of hard material vulcanized to the rim and formed with a plurality of openings corresponding to and in radial alinement with the openings in the rim, the base being engaged by the flanges on the rim, a rubber body portion vulcanized to the base and provided with a plurality of radially disposed cells which register with the openings in the base, inserts in the openings to close the cells and trap the contained air, and an intervening layer of soft vulcanizable material between the inserts and the walls of the openings to adhere to said walls and the inserts whereby to form air tight cells, and means constructed in the formation of the tire to cause the sides thereof to be distorted inwardly toward each other when load pressure is applied to progressively reduce the cubic contents of the cells and compress the air therein when the tire is subjected to load strain.

10. A tire comprising a resilient body portion and a substantially rigid rim and base, the body portion being provided with a plurality of sets of circumferential cells, the cells in each set being in transverse alinement, the rim and base having radial openings in alinement with the cells, and inserts fitted in the openings and sealing the cells to trap the air contained therein, the inserts forming one wall of each cell, the tread surface of the tire extending transversely of the outer walls of the cells to distort the latter under load strain.

11. A tire comprising a hard base and a resilient body portion formed with a plurality of individual radially disposed cells, the tread of the tire being formed with cross ribs disposed in the radial planes of the cells, the approximate circumferential width of each rib being less than the circumferential width of each cell the rib coöperates with, and means for sealing the cells and trapping the air contained therein, the ribs compensating for the material displaced in the formation of the cells and serving to distort the outer walls of said cells radially under load strain, the tire being constructed to cause the sides thereof to be distorted inwardly toward each other to coöperate with the distorted outer walls when load pressure is applied to progressively reduce the cubic contents of the cells and compress the air therein when the tire is subjected to load strain.

12. A tire comprising a permanent rim having side flanges, a base of hard non-resilient material permanently attached to the rim, the rim and base having alined openings, a resilient tire body vulcanized to the hard base and provided with a plurality of openings which register with the openings formed in the base, and inserts fitted in the openings in the rim and hard base to form with the openings in the tire body a plurality of closed cells containing compressed air.

13. A tire comprising a hard base and a resilient body vulcanized to the base and formed with a plurality of radial openings, radial plugs in the openings to provide with same a plurality of closed cells containing compressed air, means for sealing the plugs in the tire, the resilient body having a plurality of ribs of less width than the width of the cells corresponding to the number of and located in substantially radial lines with the latter whereby to provide substantially the same body of resilient material in line with the cells as the portion of the tire adjacent said cells, and to permit the outer walls of the cells to be distorted, the tire body being formed with means to cause the side walls of the cells to be distorted inwardly when the outer walls thereof are distorted under load strain.

14. A tire comprising a plurality of layers of rubber, one of the layers of rubber being more resilient than the others and provided with a plurality of cells, means for individually sealing the cells to trap air therein, the tire being constructed to cause the sides thereof to be distorted inwardly toward each other when load pressure is applied to progressively reduce the cubic contents and compress the air therein when the tire is subjected to load strain.

15. A tire comprising a body portion formed of strata of rubber of different degrees of resiliency and formed with a plurality of closed cells containing compressed air, the intermediate stratum of rubber being more resilient than certain of the other strata, the side and transverse walls of the cells being formed by the intermediate strata of rubber, the sides of the tire being concave to cause the walls of the cells to be distorted inwardly under load strain to compress the air in said cells.

16. A tire comprising a resilient body portion formed with a series of cells containing compressed air, and an insert in each cell to seal the latter, the air in the cells being compressed through the medium of the inserts when sealing said cells, the tire being constructed to cause the sides thereof to be distorted inwardly toward each other when load pressure is applied to progressively reduce the cubic contents of the cells and compress the air therein when the tire is subjected to load strain.

17. A tire comprising a body formed of strata of rubber, the intermediate stratum of rubber being more resilient than the outer stratum of rubber, the tire being formed with a plurality of radially disposed closed cells containing compressed air, the intermediate resilient stratum of rubber forming the transverse and side walls of the cells.

18. A tire comprising a body formed with a plurality of closed spaced cells and hollow inserts fitted in the inner ends of the cells, said inserts forming the inner walls of the cells, the tire body being constructed to cause the sides thereof to be distorted inwardly toward each other when load pressure is applied to progressively reduce the cubic contents of the cells and compress the air therein when the tire is subjected to load strain.

19. A tire comprising a body formed with a plurality of closed spaced cells, a rim permanently attached to the body of the tire and formed with openings which register with the cells, hollow inserts fitted in the openings in the rim and extended into the cells, said inserts forming the inner walls of the cells, the tire body being constructed to cause the sides thereof to be distorted inwardly toward each other when load pressure is applied to progressively reduce the cubic contents of the cells and compress the air therein when the tire is subjected to load strain.

20. A tire comprising a body formed with a plurality of closed spaced cells and metal inserts fitted in the inner ends of the cells, said metal inserts forming the inner walls of the cells, the tire body being constructed to cause the sides thereof to be distorted inwardly toward each other when load pressure is applied to progressively reduce the cubic contents of the cells and compress the air therein when the tire is subjected to load strain.

In testimony whereof I affix my signature.

JAMES C. ANDERSON.